United States Patent [19]

Robertson, Jr. et al.

[11] Patent Number: 4,599,550
[45] Date of Patent: Jul. 8, 1986

[54] DIGITAL GENERATION OF 3-PHASE PWM WAVEFORMS FOR VARIABLE SPEED CONTROL OF INDUCTION MOTOR

[75] Inventors: John W. Robertson, Jr., Willowick; Stuart B. Siegel, Willoughby, both of Ohio

[73] Assignee: The Babcock & Wilcox Company, New Orleans, La.

[21] Appl. No.: 718,690

[22] Filed: Apr. 2, 1985

Related U.S. Application Data

[63] Continuation of Ser. No. 375,796, May 7, 1982, abandoned.

[51] Int. Cl.$^4$ .............................................. H02P 5/40
[52] U.S. Cl. .................................... 318/811; 318/798; 318/806
[58] Field of Search ................ 318/811, 803, 807–810, 318/798, 802, 806; 363/40–43

[56] References Cited

U.S. PATENT DOCUMENTS

| | | | |
|---|---|---|---|
| 4,091,294 | 5/1978 | Zankl et al. | 318/808 |
| 4,290,108 | 9/1981 | Woehrle et al. | 318/810 |
| 4,346,434 | 8/1982 | Morinaga | 318/341 |
| 4,348,734 | 9/1982 | Dougherty | 363/41 |
| 4,387,421 | 6/1983 | Zach et al. | 318/811 |
| 4,419,615 | 12/1983 | Mauto et al. | 318/807 |

OTHER PUBLICATIONS

Sen et al, "Induction Motor Drives with Microcomputer Control System", Conference: IAS Annual Meeting, 1980 Cincinnati, Ohio, USA, Sep. 28–Oct. 3, 1980, pp. 653–662.
Buja et al, "A Microcomputer–Based, Quasi-Continuous Output Controller for PWM Invertors", IEEE Industral Electronic and Control Instrumentation '80, Conference Mar. 17–20, 1980, pp. 107–111.
Mazur, T., "A Rom–digital Approach to PWM–Type Speed Control of AC Motors", AN–733, 1974, Motorola.

Primary Examiner—David Smith, Jr.
Attorney, Agent, or Firm—Vytas R. Matas; Robert J. Edwards

[57] ABSTRACT

Programmed digital equipment is utilized to generate three-phase pulse width modulated waveforms that are used in controlling an induction motor. A microprocessor is programmed to initialize conditions in the system, to perform a main task including the storage of converted analog signal, the checking of limits of motor motion and information fed back from the motor concernings its position, and the ramping of frequencies to change the position of the motor. A memory is provided for the programming which memory also contains tables that correspond to 90° of each desired wave form. A single 90° segment of each wave form is needed to generate all parts of each of the three phases. An analog to digital converter is utilized to convert analog information concerning gain, set point, dead band and feedback signal into digital signals which are stored and processed by the microprocessor. Programmable timers are connected to the microprocessors for generating the wave forms and for supplying master timing and interrupt signals indicative of an undesirable condition in the motor control.

2 Claims, 6 Drawing Figures

4,599,550

DIGITAL GENERATION OF 3-PHASE PWM WAVEFORMS FOR VARIABLE SPEED CONTROL OF INDUCTION MOTOR

This is a continuation of application Ser. No. 375,796, filed May 7, 1982, now abandoned.

FIELD AND BACKGROUND OF THE INVENTION

The present invention relates, in general, to the control of three-phase induction motors and, in particular, to a new and useful method and apparatus for generating digital pulse width modulated waveforms which can be used for the constant torque variable speed control of an induction motor for closed loop position control.

Previous methods utilize analog circuitry consisting of sinusoidal and triangular wave form generators to produce the pulse width modulated wave forms necessary to control a three-phase induction motor for constant torque variable speed control. The analog technique is usually complex, requiring numerous factory and field adjustments. The analog system is difficult to reconfigure to different applications after final design.

Limited use of digital techniques (including microprocessors) have been attempted for open loop induction motor speed control.

In U.S. Pat. No. 4,099,109 to Abbondanti, a digital apparatus for synthesizing pulse width modulated wave forms is disclosed. According to that reference, however, the wave forms are selected by hardware. The versatility of Abbondanti for adapting the induction motor control to various applications is thus limited. In addition, the provision of the required logic for the induction motor control using hardware limits the flexibility of such control, and the adaptability thereof to various different conditions and requirements.

SUMMARY OF THE INVENTION

The present invention relates to a method and device for the generation of pulse width modulated wave forms that are controlled by a microprocessor and are used to generate three-phase wave forms required for the variable control of an induction motor.

Additional information which is useful in understanding the present invention can be found in a copending application entitled "HIGH TORQUE SERVO POSITIONER USING THREE PHASE VARIABLE FREQUENCY CONSTANT TORQUE CONTROLLER", which is incorporated here by reference.

The use of three-phase AC induction motors to replace DC motors for various control functions such as the movement of butterfly valves and the like, has become increasingly popular with the introduction of controllers which can vary the three-phase wave forms applied to the induction motors. This is due to the reduced size and complexity of AC induction motors, particularly in the range of horsepower ratings below 10.

According to the present invention, real time software is utilized in the microprocessor to control the pulse width modulated wave form shape and also to control logic involving interrupt and control signals. The use of real time software increases the flexiblity of the system to adapt to different conditions and application.

The method and device according to the invention uses digital techniques to generate the pulse width modulated(PWM) wave form. The close interrelationship between the hardware (microprocessor and related peripherals) and the real time software allow the efficient generation and control of the pulse width modulated waveforms for both open loop and closed loop systems.

This method allows the easy alteration of the control techniques and PWM generation for closed or open loop control with no hardware redesign involved. Necessary changes required for different applications can be implemented in the real time software.

This method requires no factory calibration after the real-time software is configured for the intended application.

Accordingly, an object of the present invention is to provide a device for generating three-phase pulse modulated wave forms to control an induction motor which overcomes the drawbacks of an analog modulation device, and which generates wave forms for any assigned output level.

A further object of the invention is to utilize a microprocessor in such control which is programmable so as to adapt to different control requirements and conditions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
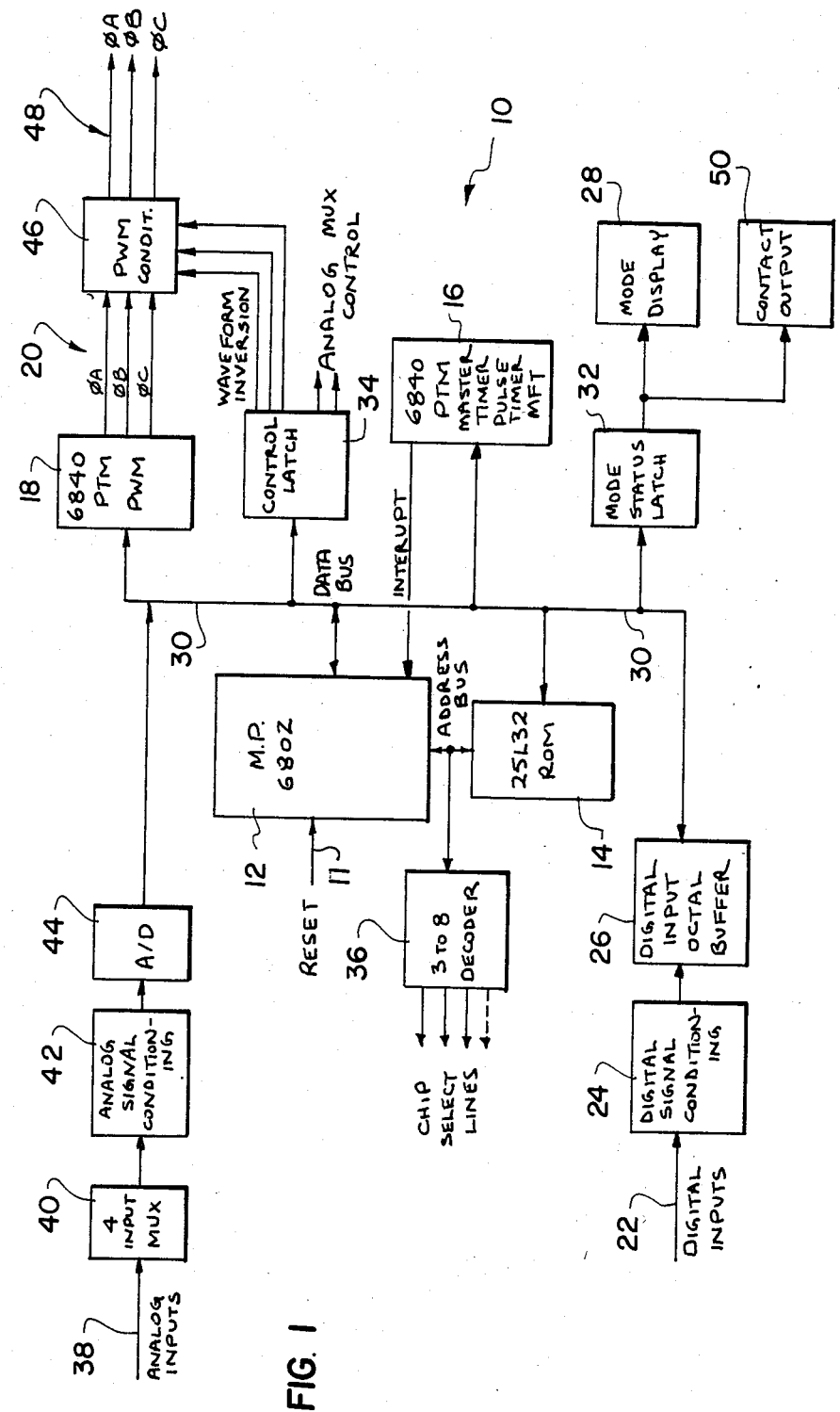
FIG. 1 is a block diagram of a position control module used in generating the pulse width modulated wave forms.

Referring to the drawings in particular, the invention embodied therein comprises a device 10 for generating three-phase pulse width modulated waveforms allowing variable speed control of an induction motor.

Figure 6:
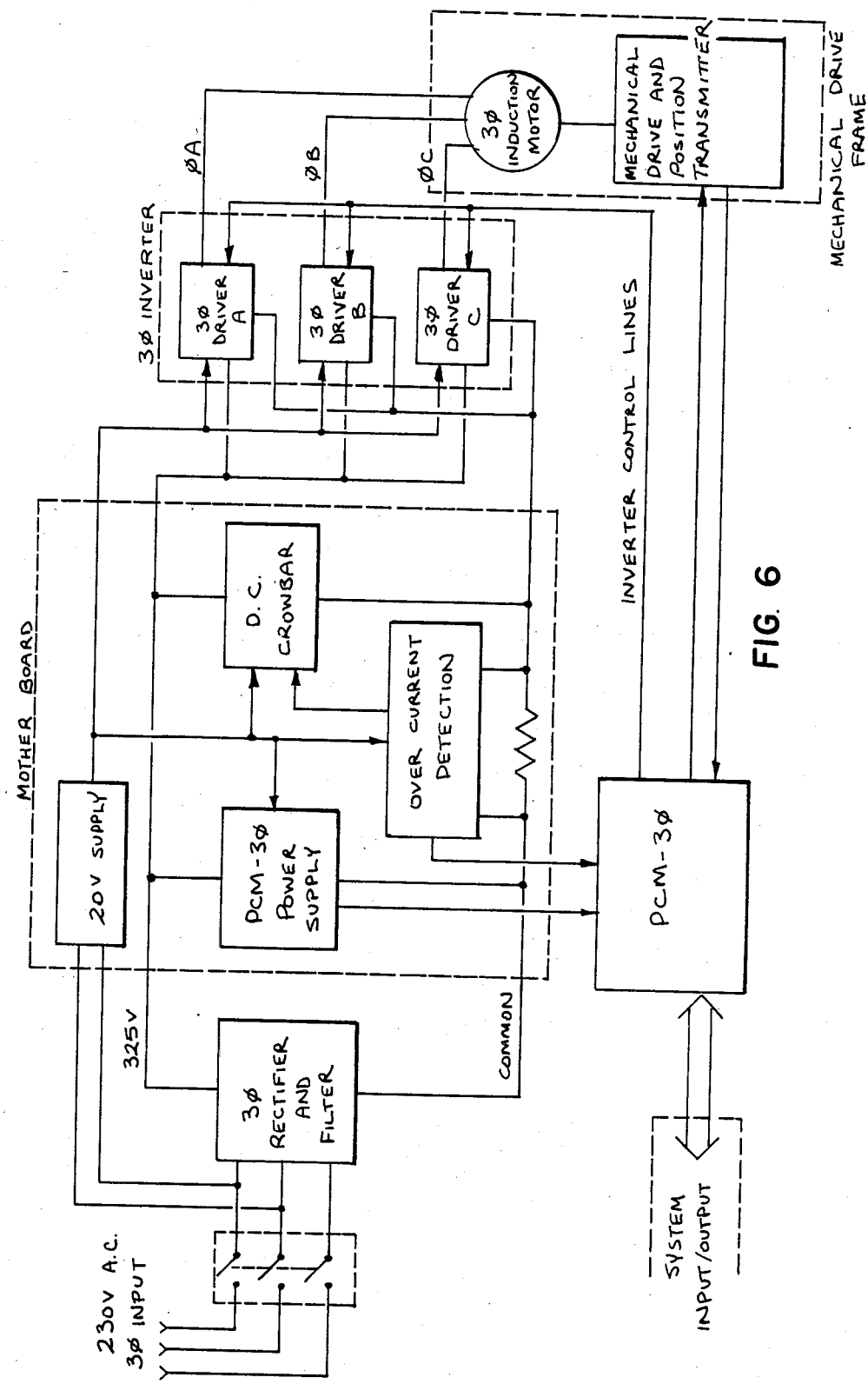
FIG. 6 is a schematic representation of the position control module of the invention in a three-phase drive controller for an induction motor.

The inventive method is implemented by hardware and real time software, which is completely contained on a circuit card designated as the Position Control Module 10 in FIG. 1 (PCM). The PCM is an integral part of another system designated a Three Phase Drive Controller (FIG. 6). The Three Phase Drive Controller controls the motion of a motor to set the position of dampers, air registers, butterfly valves, or other process control elements which requires the motor or servo positioner to control their position from a remote location.

The Position Control Module provides the intelligence for the Three Phase Drive Controller. The PCM is a self-contained microcomputer which accepts control system inputs and, based on those inputs, develops logic level pulse width modulated (PWM) waveforms which are applied to three power switching modules which are external to the PCM.

The PCM uses a MC6802 microprocessor 12 with up to 4K bytes of program storage. The processor is an interrupt driven machine with priority given to updating the real time 30 PWM waveform outputs to the induction motor. The remaining processor time is used to check control system inputs, perform calculations, and display controller status.

The functional diagram of the PCM hardware is shown in FIG. 1. A schematic of the PCM is shown in FIG. 6, in a three-phase drive controller.

A microprocessor based system for three phase motor control is more versatile than a dedicated analog or digital logic design. The ease of software modification allows the functional performance of the controller to be easily changed to a new application.

The microprocessor 12 used in the PCM as a central control unit is the Motorola 6802. The 6802 processor includes 128 bytes of RAM and an onboard system clock.

The control software requires approximately 3K bytes of memory. The software is stored in a 4K ultra violet erasable read only memory 14 such as a 25L32 or 27L32 device. These devices have access times of 450 nsec., which is sufficient for this application. The ROM addresses are located at the top of the memory from $F000 to $FFFF.

The control program uses only the 128 bytes of RAM located on the 6802 12. The RAM is used for buffers and variable storage. The RAM address locations are from $0000 to $007F.

The design includes two Motorola 6840 programmable timers modules 16 and 18 (PTM). Three individual timers are located on one LS1 device. The timers are used to generate the output waveform pulse patterns at 20, measure time varient digital inputs, generate interrupts, and provide a machine fault time (MFT) function.

The timers (16, 18) are operated in the single shot mode. This mode allows a 16 bit binary number to be loaded into a timer latch. Count down is initiated through software or external logic control. A complete countdown to 0 of the 16 bit binary number generates an interrupt, or changes the state of the output associated with that timer. The rate at which count down occurs is determined by the system clock or an external clock source.

Four timers (in 18) are dedicated to the generation of the three pulse width modulated waveforms 20. One timer is the master time (in 16) which generates processor interrupts at a rate proportional to the output frequency of the controller. The interrupt routine updates the other three timers, each dedicated to a phase output, with the new PWM waveform values.

The processor timer not associated with the interrupt routine is used to complete the main task of the control software to be described later. The use of the timers minimize the processor overhead associated with the generation of the PWM waveforms.

The digital system inputs 22 are all TTL logic level. The incoming digital inputs are all filtered at 24 to eliminate noise generated by the high power inverter circuitry. In addition, transient protection is provided to suppress electrical surges. The inputs are buffered and interfaced to the processor by an octal buffer 26.

Digital signals which are outputted by the processor 12 for control of the PWM waveform 20, mode status at latch 32, and analog multiplexing interface to their associated circuitry by octal latches. The octal latches are a low cost method of digital interface for a given dedicated application. The latch 32 dedicated to controller mode display 28 is configured to allow data bus information from line 30 to be displayed under program control. This feature is beneficial for both testing and analog calibrations at 28.

Latches, buffers, programmable timers, memory, and the analog to digital converter are all memory mapped by a 3 to 8 digital decoder 36. The decoder segments the memory into 8 addressable zones. All necessary logic has been included to insure the proper timing of data, address, and chip select lines.

A machine fault timer (MFT) in 16 has been provided on the PCM 10 to reset the processor 12 in the event a noise pulse or bad address disturbs the normal software execution. The MFT is updated by the processor during a regular known program sequence. The absence of this update implies a software failure. The MFT times out and resets the processor, reinitializing the system as will be described later.

Four analog signals at line 38, are recognized by the PCM 10. Two represent the gain and deadband control parameters which are generated internally by potentiometers. The parameters are associated with closed loop position control. They can easily be redefined in software for other applications. The remaining two are the setpoint and the feedback analog inputs which originate from a control system (FIG. 6). Each analog signal has the voltage range of 0.75 to 5.25 V dc. The feedback and setpoint signals, in addition, can be 4–20 mamp. signals which are converted to voltages by the PCM. The advantage of a current input signal is reduced noise and no attentuation due to long signal wires. The feedback signal is buffered and outputed to the control system for other control applications.

The four analog voltages are selected individually for A/D (analog to digital) conversion by an analog multiplexer 40 under processor control. The selected analog voltage is applied to a level shifter and filter 42 for proper signal conditioning before the 8 bit A/D conversion 44. The A/D converter 44 has an adjustable zero and span allowing maximum resolution for the given input voltage range. The span and zero are adjusted for allowing the 0.75 and 5.25 V dc input range (corresponds to −5% to 105% of variable) to convert from 0 to 255 counts of digital data. The A/D interfaces to the processors by internally contained three state buffers which are controlled by the processor 12.

Accurate conversions are possible by proper printed circuit layout and component selection. Reduction of digital noise generated by the microprocessor is reduced by separating the analog and digital ground returns, placement of components, and physically segregating all analog components from digital components. The component tolerances and temperature coefficients are selected such that an accuracy of more than 0.3% is maintained across the temperature range of 40° to 140° F.

The PWM waveform 20 which is outputed by the programmable timers is conditioned at 46 before being applied to the phase driver inputs 48. The activation of the positive and negative phase outputs are non-overlapping to insure safe operation of the 3 phase inverter. A 24 microsecond dead time is created by a shift register and various logic elements. A processor controlled latch 34 generates waveform inversion signals which are combined with the timer outputs 20 to reduce the memory table associated with the waveforms by 50%. This same latch 34 has the capability to interrupt the waveform outputs instantly under program control. The conditioned waveform outputs are buffered by a darlington transistor package before leaving the PCM at 48.

Two hardware interrupts are generated for processor recognition. The most active interrupt is generated by the master timer. The master timer (also in 16) generates maskable interrupts proportional to the desired output frequency. The interrupt is electrically generated by the 6840 PTM 16. The second interrupt (overcurrent condition) is generated by circuitry external to the PCM. This interrupt is also processed by the maskable interrupt of the processor. The two interrupts are distinguished by polling the 6840 timer 16.

Figure 2:
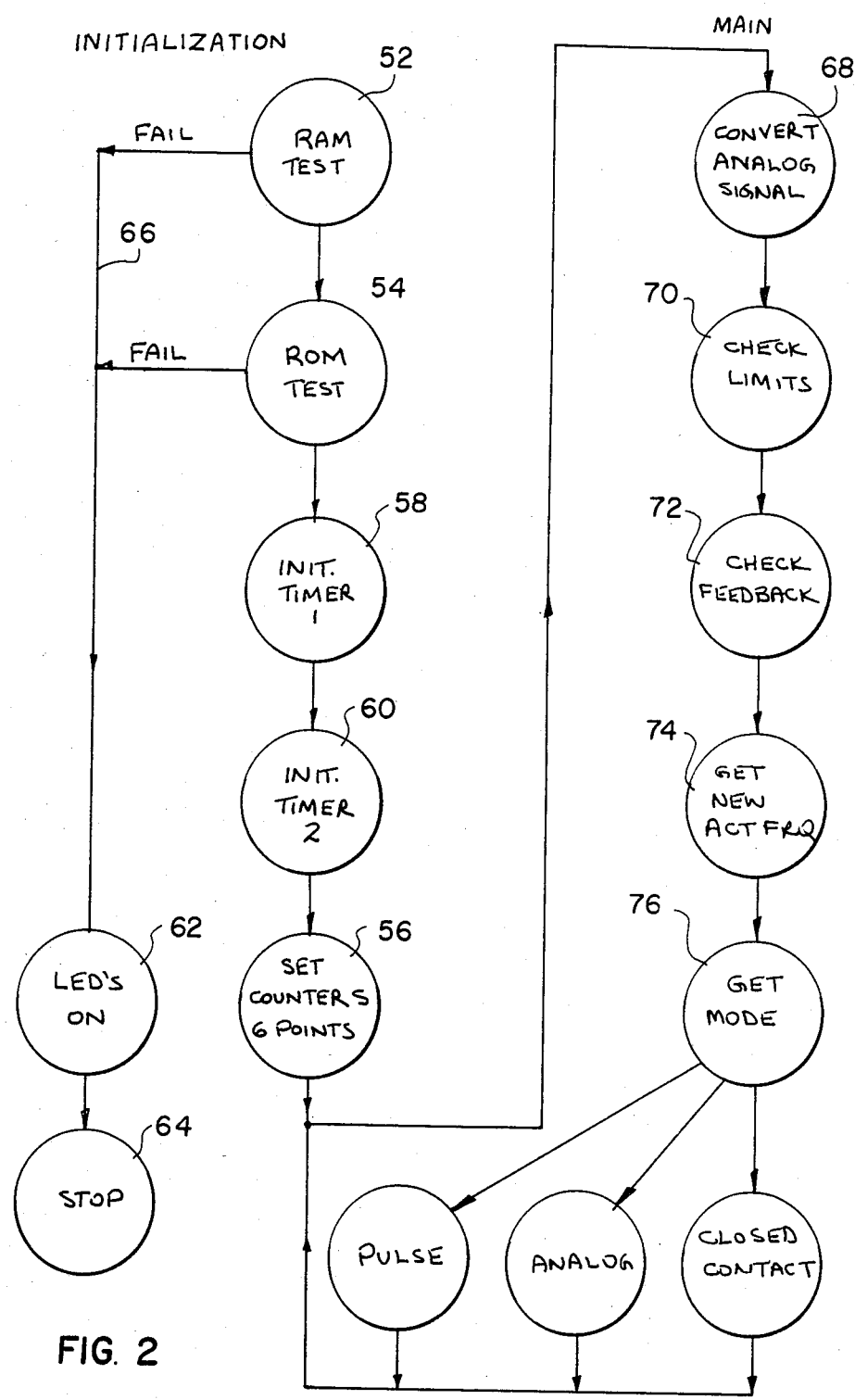
FIG. 2 is a flow chart showing the initializing and main tasks of a microprocessor programming according to the invention.
Figure 3:
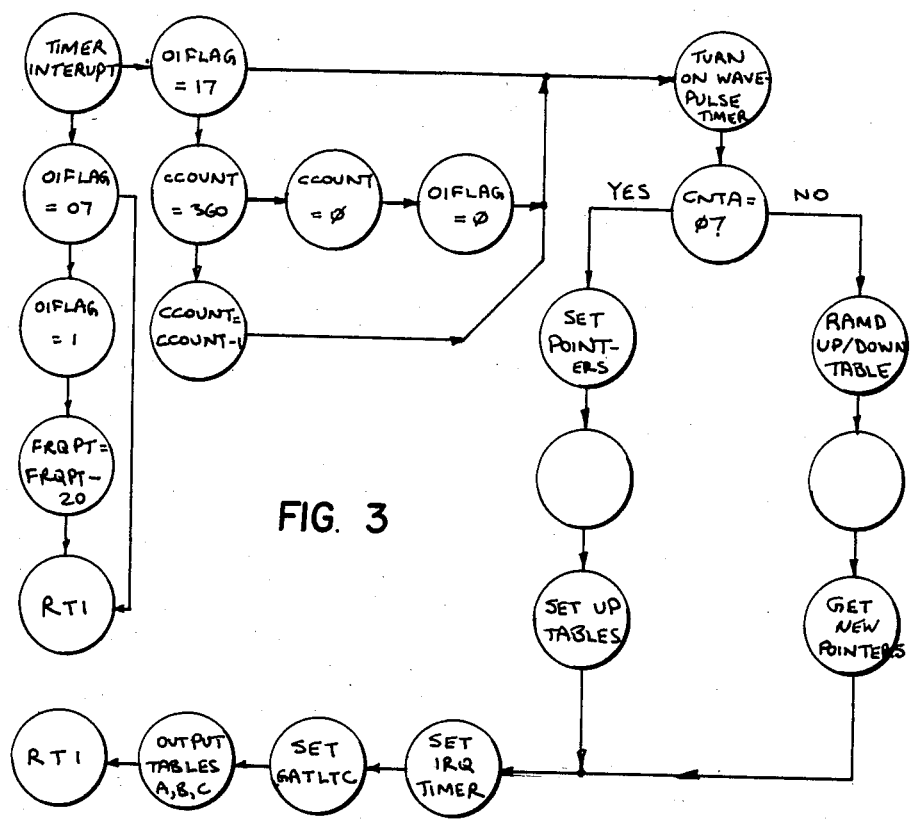
FIG. 3 is a flow chart of wave pulse and overcurrent processing tasks of the microprocessor programming.
Figure 4:
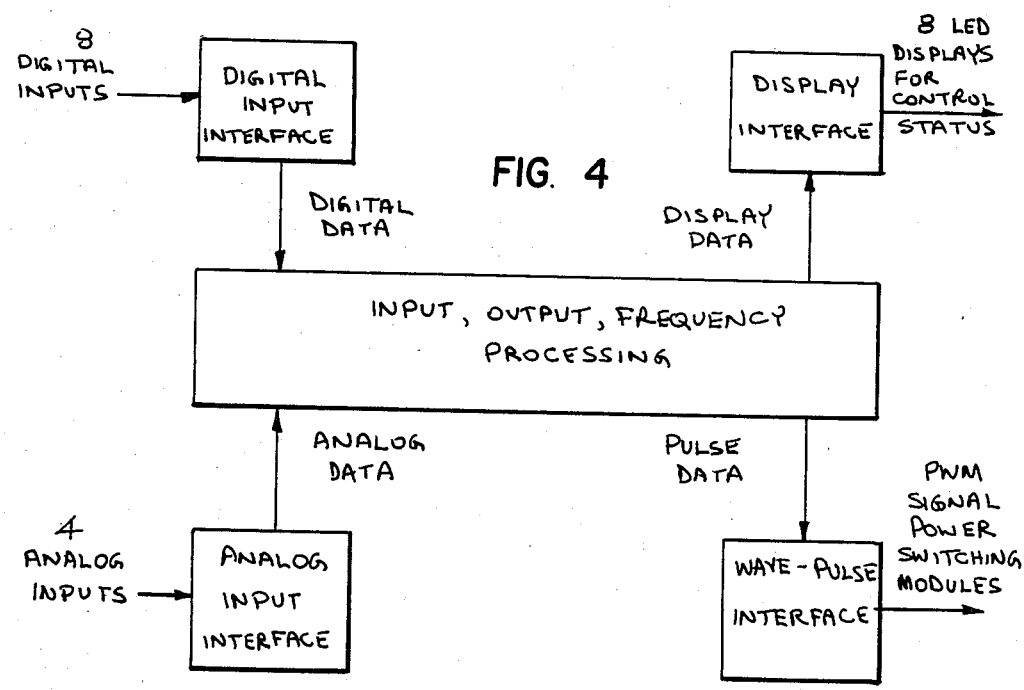
FIG. 4 is a block diagram illustrating the analog and digital interfaces to the microprocessor.

The functions of the microprocessor 12, according to the processor software, are as follows. The microprocessor must read inputs, decide what mode is being input, and process that mode. Then the processor must determine the proper frequency, and output this frequency via the programmable timer 18. FIGS. 2 and 3 show a state diagram overview of these functions. FIG. 4 shows the analog and digital interface to the processor. The processor software is written entirely in machine code to maximize processor time available for response to control system parameters.

After receiving a RESET input at 11, the microprocessor 12, as shown in FIG. 2, goes into a normal software reset—RAM test (52), ROM checksum test (54), setting of the stack pointer (56), initializing both programmable times (58,60), setting up Machine Fault Timer, setting up pulse storage timer, and setting up the first IRQ timer value.

If either the RAM or ROM test fail (line 66), the processor turns all LEDs (62) on and stops (64).

The main task of the processor 12, handles analog conversions, checks limit conditions, checks feedback, ramps of frequency, and checks the mode of operation.

In this section (68) the processor 12 converts the analog signals. The analog signals are converted to hexadecimal and stored in RAM for use later. Each analog signal thus converted is determined by the input of the multiplexer 40.

Next, limit checking occurs (70). If either limit is set (up or down), the DESFRQ (Desired Frequency) is set to zero. Then as long as a limit is set, the DESFRQ equals zero only in the direction of the limit. This causes the motor to be able to run in the opposite direction of the limit condition. The limit inputs can be externally configured to provide system control of the motor.

Next, feedback checking occurs (72). The function of this section is to determine the maximum allowable frequency (DESFRQ) output for the given application.

The ramping of frequency (74) only occurs after so many passes of the wave pulse output. When the actual frequency (ACTFRQ) is to be ramped, the processor decides if the actual direction (ACTDIR) is equal to the desired direction (DESDIR). If the directions are not equal, the ACTFRQ must be ramped down to ∅ Hz (motor stopped) before the directions can be set equal, and once the directions are set equal the processor decides whether to ramp the frequency or not, and if so, in which direction. The following tests are made and the results are as follows:

| | |
|---|---|
| ACTFRQ = DESFRQ | ACTFRQ = ACTFRQ |
| ACTFRQ > DESFRQ | ACTFRQ = ACTFRQ − 3 |
| ACTFRQ < DESFRQ | ACTFRQ = ACTFRQ + 3 |

Then a pointer is set up at the beginning of the proper table of ACTFRQ.

The next task is mode selection (76). This portion of the real time software can be configured to allow control of a particular application. This section of the software will contain all applicable control algorithms for a given application. The ACTFRQ and DESFRQ values are determined in this portion of the software.

The IRQ interrupt is used for an over-current condition and wave-pulse output, as shown in FIG. 3. Over-current condition is noted by hardware, which gives the processor an IRQ interrupt. The response of the processor to an over-current interrupt is dependent on the application. If the over-current condition is determined undesirable, the motor is turned off and a manual RESET must occur to INITIALIZE the controller again.

Figure 5:
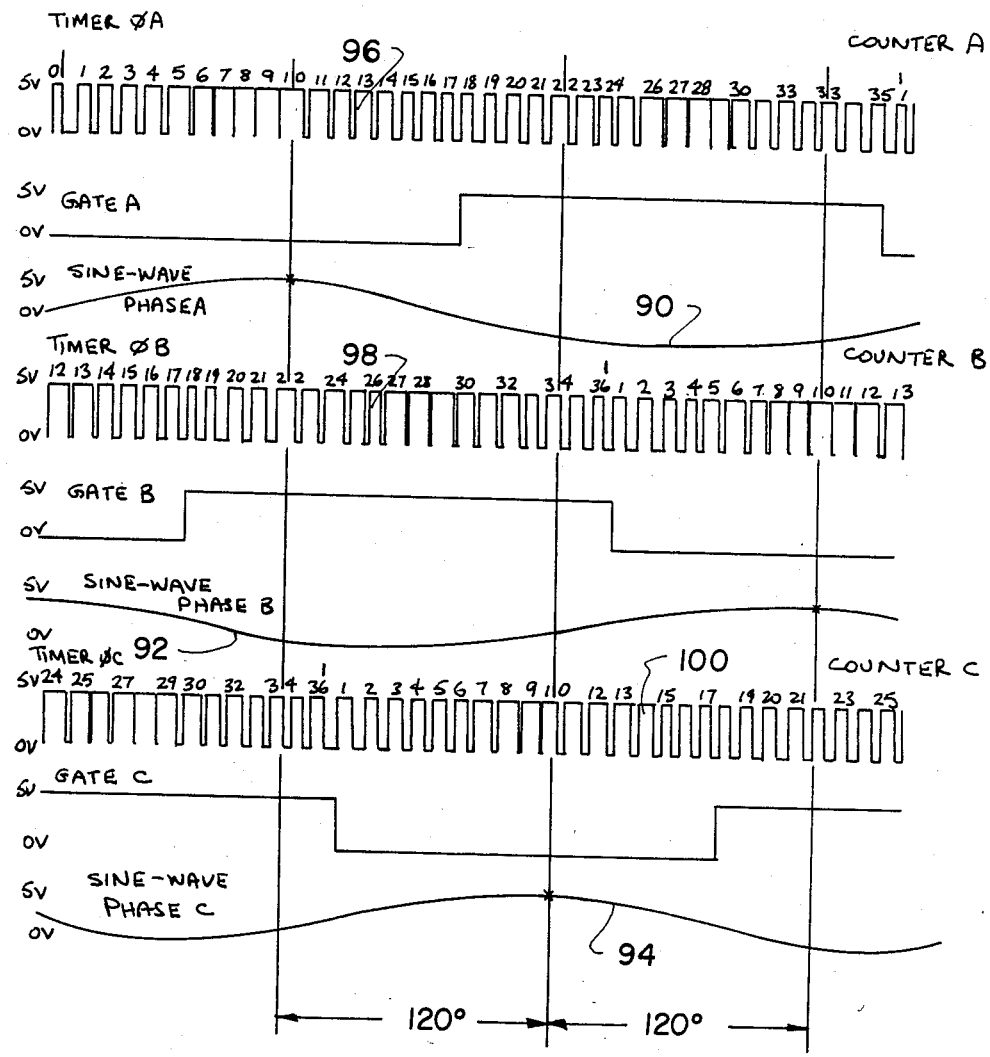
FIG. 5 is a diagram showing the three-phase pulse modulated wave forms.

The desired outputs are three sine-waves 90, 92, 94 in FIG. 5, which are used to drive the three phases of a three-phase induction motor. The three sine-waves either lead or lag each other by 120° per phase. A reverse in the phasing of the sine-waves results in a reverse in the direction of the motor.

The establishment of the square pulse patterns 96, 98, 100, leading to the superimposed sine wave is known as pulse width modulation. Twenty-four, thirty-six, seventy-two or one-hundred and fourty-four equal pulses (frequency determining the number) with varying "on-times" are used to generate the sine wave of the desired frequency. The number of pulses per cycle can be altered for any given frequency under software control. Thirty-six pulses are used in FIG. 5. The "on-time" for each pulse is calculated from the following formula:

$$T = \left[ \frac{1}{2fI} + \frac{V \sin\theta}{650 fI} \right]$$

where
T = time in microseconds
f = fundamental frequency (3 through 60 Hz in 3 Hz increments)
θ = phase angle in degrees (2.5°, 5.0°, 10°, or 15° increments from 0° to 90° depending on fundamental frequency)
I = increments per cycle
 f = 3.6 Hz I = 144
 f = 9, 12, 15, Hz I = 72
 f = 18 thru 45 Hz I = 36
 f = 48 thru 60 Hz I = 24
V = desired peak voltage in volts (adjusted for maximum motor torque).

FIG. 5 shows the pulse pattern sine wave relationship. The negative half of the sine-wave is derived from the complement of this signal.

The method for each of the three phase waveforms is the same. The ROM 14 contains 20 different tables. Each table corresponds to a different output waveform frequency (ranging from 3 to 60 Hz in 3 Hz increments). The entries in each table are the programmable timer values necessary to create 90 degrees of a 360 degree PWM sine wave. The entire sine wave is created by repeating the entries in the table in the proper sequence and proper control of the waveform inversion control lines outputed by latch 34. Only one table is necessary to generate all three phase outputs. The individual phases require the same timer values for a given frequency. It is just necessary to displace the three waveforms by 120° with respect to each other.

The programmable timer values located in each frequency table do not necessarily have to be sine weighted. The timer values can be changed to provide non-sinusoidal waveforms to achieve greater average voltage output resulting in a different motor torque relationship.

The method used in creating this sine-wave is the same whether 24, 36, 72, or 144 pulses per cycle are outputed.

Initialization of each waveform is approximately the same. The counters and pointers are set up, inversion latch set, and IRQ time is determined. Table I shows the initialization of counters and pointers for each number of pulses. PNTA, PNTB and PNTC are the pointers for the three phases A, B and C; FRQPT is frequency point; and CNTA, CNTB, and CNTC are the counts for the three phases.

The output for each phase is similar regardless of the number of pulses. A 36 pulse output will be shown in more detail.

The pointers move up and down the table depending on the value of the counter that it is associated with. See Tables II and III for an example of this. A gate is also set or reset, depending on the count of the counter for each phase. When the counter reaches its limit, it is set to zero and the process starts over again.

Frequency change can only occur when CNTA=∅.
IRQ time is determined by:

$$IRQ\ Time = (microseconds)\left(\frac{1}{\# \times freq.} \times 10^6\right) - 290$$

where #=number of pulses per frequency. The IRQ time is loaded into a programmable timer module and this determines the rate of IRQ interrupts.

TABLE I

| 24 Pulses | | | |
|---|---|---|---|
| | PNTA = FRQPT > | | CNTA = 0 |
| | PNTB = FRQPT > | +8 | CNTB = 8 |
| | PNTC = FRQPT > | +8 | CNTC = 16 |
| 36 Pulses | | | |
| | PNTA = FRQPT > | | CNTA = 0 |
| | PNTB = FRQPT > | +12 | CNTB = 12 |
| | PNTC = FRQPT > | +12 | CNTC = 24 |
| 72 Pulses | | | |
| | PNTA = FRQPT > | | CNTA = 0 |
| | PNTA = FRQPT > | +24 | CNTB = 24 |
| | PNTC = FRQPT > | +24 | CNTB = 48 |
| 144 Pulses | | | |
| | PNTA = FRQPT > | | CNTA = 0 |
| | PNTB = FRQPT > | +48 | CNTB = 48 |
| | PNTC = FRQPT > | +48 | CNTC = 96 |

TABLE II

| Table | Count | | | | | |
|---|---|---|---|---|---|---|
| XX Ⓐ | 0 | Ⓐ | 18 | | | 36 = 0 |
| XX ↓ | 1 | | 17 | | 19 | 35 |
| XX ↓ | 2 | | 16 | | 20 | 34 |
| XX | 3 | | 15 | | 21 | 33 |
| XX ↑ | 4 | | 14 | | 22 | 32 |
| XX ↑ | 5 | | 13 | | 23 | 31 |
| XX Ⓑ Ⓒ | 6 | | 12 | Ⓑ | 24 Ⓒ | 30 |
| XX ↓ | 7 | | 11 | | 25 | 29 |
| XX ↓ | 8 | | 10 | | 26 | 28 |
| XX | 9 | | | | 27 | |
| at start: | CNT Ⓐ = 8 | | | | PNT Ⓐ = 6 | |
| | CNT Ⓑ = 12 | | | | PNT Ⓑ = 6 | |
| | CNT Ⓒ = 24 | | | | PNT Ⓒ = 6. | |

Pointers (PNT) Ⓑ and Ⓒ at the same location but more in opposite directions because of CNT values.

TABLE III

| Counter | Pointer Movement | Gate |
|---|---|---|
| 0–9 | inc ↓ | 0 pos |
| 10–18 | dec ↑ | 0 pos |
| 19–27 | inc ↓ | 1 neg |
| 28–36 | dec ↑ | 1 neg |

The time required to process an IRQ interrupt directly affects the overall system response of the PCM 10. The IRQ routine is given top priority to allow the real time PWM waveform outputs 48 to continue without interruption The IRQ execution time is reduced by the use of efficient machine instructions at the expense of increased memory locations necessary to store the IRQ routine.

An increase of PWM output frequency resolution for more precise control applications can be obtained by increasing the number of frequency tables located in the ROM. The system response will not be significantly decreased by the addition of more output frequencies.

What is claimed is:

1. A device for generating three-phase, pulse width modulated waveforms for a three-phase, variable speed, constant torque, induction motor controller for a high torque servo positioner operated by a three-phase induction motor comprising:

microprocessor means programmed for various control functions including initialization, a main task, pulse width modulated waveform generation, and interrupt processing, the main task control function comprising (i) storing a converted analog signal, (ii) checking limits of motor position and when such limits are reached, setting desired driving frequency to zero, (iii) checking a feedback signal which is indicative of the motor servo position, (iv) ramping actual driving frequency to meet the desired driving frequency, and (v) calculating desired driving frequency according to at least one algorithm;

a read only memory connected to said microprocessor means for containing the programming thereof and for containing a plurality of tables each corresponding to a desired driving frequency;

an analog to digital converter connected to said microprocessor means for receiving analog control signals, said analog control signals corresponding to gain, set point, feedback, and deadband signals for said servo positioner, said converter operable to convert at least one of said analog control signals at a time into said converted analog signal readable by said microprocessor means;

a plurality of timers connected to said microprocessor means for receiving information from one of said tables in said memory to generate timer outputs corresponding to 90° segments of said three-phase, pulse width modulated waveforms for said induction motor controller;

a latch responsive to said microprocessor means for generating a plurality of inversion control signals in response to said microprocessor means;

a pulse width modulated waveform conditioner connected between said latch and said plurality of timers and responsive to said plurality of inversion control signals to pass said timer outputs to said induction motor controller in an inverted or noninverted state; and at least one additional timer connected to said microprocessor means for generating an interrupt signal upon occurrence of an undesirable condition for the motor, said interrupt signal applied to said microprocessor means.

2. A method for generating three-phase, pulse width modulated waveforms for a three-phase, variable speed, constant torque, induction motor controller for a high torque servo positioner operated by a three-phase induction motor comprising:

receiving analog control signals, said analog, control signals corresponding to gain, set point, feedback, and deadband signals for said servo positioner;

converting at least one of said analog control signals at a time into a converted analog signal;

performing a main task control function, the main task control function comprising (i) storing said converted analog signal, (ii) checking limits of motor position and when such limits are reached, setting desired driving frequency to zero, (iii) checking a feedback signal which is indicative of the motor servo position, (iv) ramping actual driving frequency to meet the desired driving frequency, and (v) calculating desired driving frequency according to at least one algorithm;

receiving information from one of a plurality of tables contained in a read only memory, each of said tables corresponding to a desired driving frequency;

generating timer outputs corresponding to 90° segments of said three-phase, pulse width modulated waveforms for said induction motor controller;

generating a plurality of inversion control signals in response to said microprocessor means;

inverting said timer outputs in response to said inversion control signals to pass said timer outputs to said induction motor controller in an inverted or non-inverted state; and generating an interrupt signal upon occurrence occurrence of an undesirable condition for the motor, said interrupt signal applied to said induction motor controller.

* * * * *

UNITED STATES PATENT AND TRADEMARK OFFICE
CERTIFICATE OF CORRECTION

PATENT NO. : 4,599,550
DATED : July 8, 1986
INVENTOR(S) : John W. Robertson Jr. & Stuart B. Siegel It is certified that error appears in the above-identified patent and that said Letters Patent are hereby corrected as shown below:

Column 6, line 47, change the formula to:

$$T = \left[ \frac{1}{2fI} + \frac{V \sin \theta}{650fI} \right] 1,000,000.$$

Column 7, line 46, change the formula to:

$$\text{IRQ Time (microseconds)} = \left[ \frac{1}{\# \times \text{freq.}} \times 10^6 \right] - 290.$$

Column 7, lines 61-63, change to:

72 Pulses
PNTA=FRQPT>         CNTA=0
PNTB=FRQPT>  +24    CNTB=24
PNTC=FRQPT>  +24    CNTC=48.

Signed and Sealed this

Sixth Day of January, 1987

Attest:

DONALD J. QUIGG

Attesting Officer    Commissioner of Patents and Trademarks